United States Patent
Ohtsuki et al.

(10) Patent No.: US 8,441,390 B2
(45) Date of Patent: May 14, 2013

(54) EVENT DETECTING APPARATUS

(75) Inventors: Tomoaki Ohtsuki, Kanagawa (JP); Hiroyuki Tsuji, Tokyo (JP); Shouhei Ikeda, Tokyo (JP)

(73) Assignees: Keio University, Tokyo (JP); National Institute of Information and Communications Technology, Tokyo (JP)

( * ) Notice: Subject to any disclaimer, the term of this patent is extended or adjusted under 35 U.S.C. 154(b) by 685 days.

(21) Appl. No.: 12/449,964

(22) PCT Filed: Feb. 29, 2008

(86) PCT No.: PCT/JP2008/053693
§ 371 (c)(1),
(2), (4) Date: Feb. 25, 2010

(87) PCT Pub. No.: WO2008/108310
PCT Pub. Date: Sep. 12, 2008

(65) Prior Publication Data
US 2010/0164780 A1    Jul. 1, 2010

(30) Foreign Application Priority Data
Mar. 6, 2007  (JP) .................................. 2007-056462

(51) Int. Cl.
*G01S 13/04*  (2006.01)
*H04B 7/04*  (2006.01)

(52) U.S. Cl.
USPC ............................................. 342/28; 342/27

(58) Field of Classification Search ................ 342/27–28
See application file for complete search history.

(56) References Cited

U.S. PATENT DOCUMENTS 6,658,234 B1 * 12/2003 Dogan et al. ................. 455/63.1
6,822,606 B2 * 11/2004 Ponsford et al. .............. 342/192
7,706,478 B2 *  4/2010 Moran .......................... 375/340

(Continued)

FOREIGN PATENT DOCUMENTS

JP            11-133130 A     5/1999
JP            11-344517 A    12/1999

(Continued)

OTHER PUBLICATIONS

Kenji Terasaka et al., "Study on Indoor Human Body Detection Using UWB-IR," IEICE Transactions on Communications (Japanese Edition), vol. J90-B, No. 1, pp. 97-100, Jan. 1, 2007.

(Continued)

*Primary Examiner* — John B Sotomayor
*Assistant Examiner* — Matthew M Barker
(74) *Attorney, Agent, or Firm* — Rader, Fishman & Grauer PLLC

(57) ABSTRACT

An event detecting apparatus capable of high-precision detection of an event even by use of a narrow-band signal comprises: a plurality of antennas 21 that receive radio waves transmitted from a transmitter, a correlation matrix operation unit 22 that expresses signals received by the plurality of antennas 21 as received vectors, to operate a correlation matrix on the basis of the received vectors, an eigenvector operation unit 23 that performs eigenvalue expansion of the correlation matrix operated by the correlation matrix operation unit 22, to operate eigenvectors covering a signal subspace, and an event detecting unit 24 that detects a temporal change in the eigenvectors operated by the eigenvector operation unit 23, to detect an event.

7 Claims, 4 Drawing Sheets

U.S. PATENT DOCUMENTS

| | | |
|---|---|---|
| 2006/0007036 A1 | 1/2006 | Natsume et al. |
| 2007/0008211 A1* | 1/2007 | Yamano et al. ............... 342/70 |
| 2007/0063912 A1 | 3/2007 | Cortambert |

FOREIGN PATENT DOCUMENTS

| | | |
|---|---|---|
| JP | 2004-108851 A | 4/2004 |
| JP | 2004-109006 A | 4/2004 |
| JP | 2004-138402 A | 5/2004 |
| JP | 2005-195339 A | 7/2005 |
| JP | 2006-047282 A | 2/2006 |
| JP | 2006-190053 A | 7/2006 |
| JP | 2008-139077 A | 6/2008 |
| WO | WO-2005/050786 A1 | 6/2005 |

OTHER PUBLICATIONS

JPO Office Action, App. No. 2007-056462, Mar. 3, 2010 (4 pages).

Shohei Ikeda et al., "Indoor Event Detection With Eigenvector Spanning Signal Subspace", IEICE Technical Report, May 10, 2007, vol. 107, No. 38, pp. 13-17.

Shoei Ikeda et al., "Effects of Spatial Correlation Between Signal Subspaces on Indoor Localization Using Subspace Matching", IEICE Technical Report, Nov. 1, 2007, vol. 107, No. 306, pp. 13-17.

* cited by examiner

F I G. 4
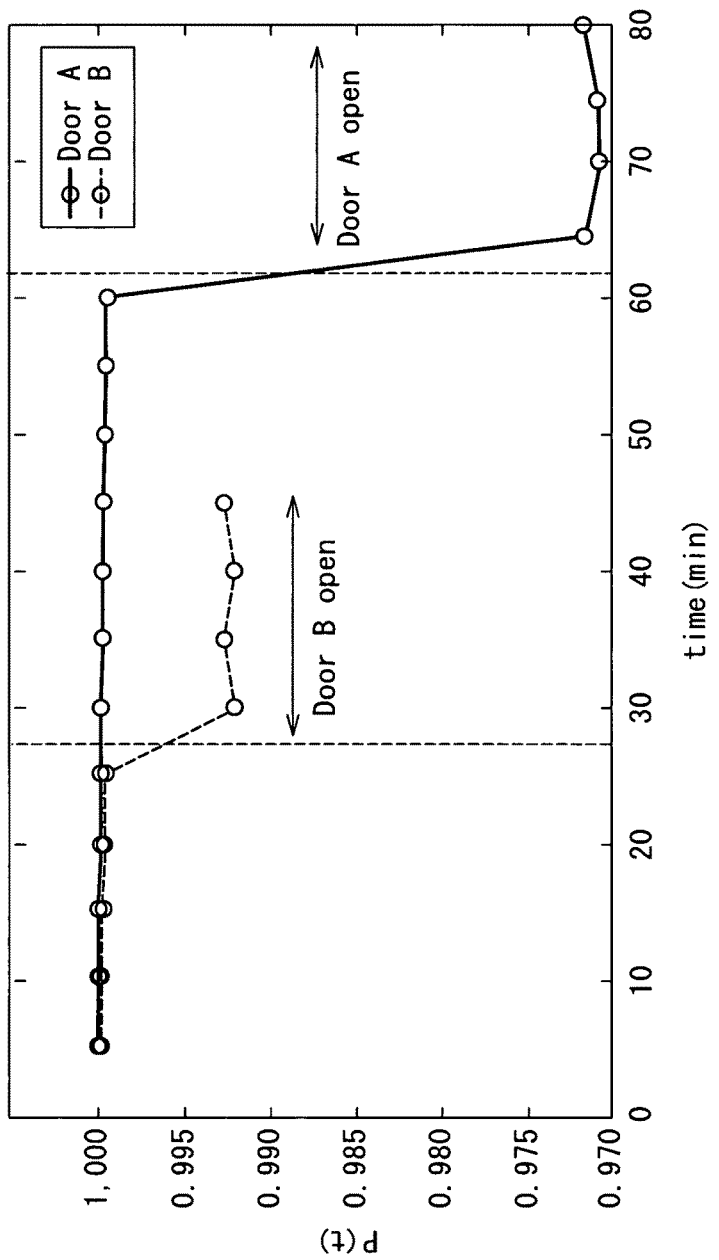

EVENT DETECTING APPARATUS

TECHNICAL FIELD

The present invention relates to an event detecting apparatus that detects an event such as a movement of a person, opening or closing of a door, or the like on the basis of received characteristics of radio waves, by disposing a transmitter that transmits radio waves and a receiver that receives radio waves transmitted from the transmitter in a predetermined area such as the interior of a room, and in particular, to an event detecting apparatus capable of simply and stably detecting a minute event.

BACKGROUND ART

As conventional event detecting apparatuses, there have been well known event detecting apparatuses that sense an intrusion of a person by installing sensors such as infrared beam sensors.

However, information obtained from a sensor is local. Therefore, in order to observe a wide range in these methods, it is necessary to install many sensors or cameras so as to eliminate caution areas or blind spots. Moreover, the sensing capabilities thereof are dependent on the function, the installing place, the number, and the like of each sensor, which leads to an increase in cost in order to improve the sensors performance.

Further, interior intruder sensing by use of UWB-IR (Ultra-wideband Impulse-radio) has been proposed (for example, refer to Non Patent Literature 1). Because this technique uses microwaves, its sensing range is wide. Further, UWB-IR has a wide band, which is excellent in pass-band resolution and permeability in respect to obstacles such as walls. Accordingly, it is possible to sense an intruder by monitoring a variation in a power delay profile with UWB-IR.
[Non Patent Literature 1] Keiji Terasaka and three others, "Study on Indoor Human Body Detection Using UWB-IR," IEICE Transactions on Communications (Japanese Edition), Jan. 1, 2007, Vol. J90-B, No. 1, pp. 97-100.

SUMMARY OF INVENTION

Technical Problem

However, with respect to UWB used in the technique of UWB-IR, the frequency bandwidth used is an ultra-wideband as its name suggests, and technological problems requiring a solution to the problem of interference with another radio service and the like remain. Further, in an instantaneous delay profile, a false alarm caused by an instantaneous variation due to small-scale fading is unavoidable.

The present invention has been achieved in consideration of the above-described problems, and an object of the present invention is to provide an event detecting apparatus which is capable of high-precision detection of an event even by use of a narrow-band signal.

Solution to Problem

An event detecting apparatus of the present invention comprises a plurality of antennas for receiving radio waves transmitted from a transmitter; a correlation matrix operation unit for operating a correlation matrix from a received vector with signals received by the plurality of antennas as the received vector; an eigen vector operation unit for operating an eigenvector which covers a signal subspace by eigenvalue expansion of the correlation matrix operated by the correlation matrix operation unit; and an event detecting unit for detecting an event by detecting a temporal change of the eigenvector operated by the eigenvector operation unit.

Further, provided that the plurality of antennas are an array antenna, it is possible to use a general-purpose array antenna.

Further, provided that the eigenvector operation unit operates an eigenvector corresponding to a maximum eigenvalue of the correlation matrix, it is possible to enhance the reliability thereof.

Provided that the event detecting unit compares an inner product of the eigenvector during normal time and the eigenvector during observation with a predetermined threshold value, it is possible to simplify operations.

Advantageous Effects of Invention

In accordance with the present invention, it is possible to detect with high precision an event such as a movement of a person, opening or closing of a door even by use of a narrow-band signal.

BRIEF DESCRIPTION OF DRAWINGS

FIG. 4 is a graph showing a state in which doors are opened being observed in time series as an evaluation of a dynamic event.

REFERENCE SIGNS LIST

10 Transmitter
20 Receiver
21 Array antenna
22 Correlation matrix operation unit
23 Eigenvector operation unit
24 Event detecting unit

DESCRIPTION OF EMBODIMENTS

Hereinafter, the best mode for carrying out the present invention will be described in detail with reference to the accompanying drawings.

Example

Figure 1:
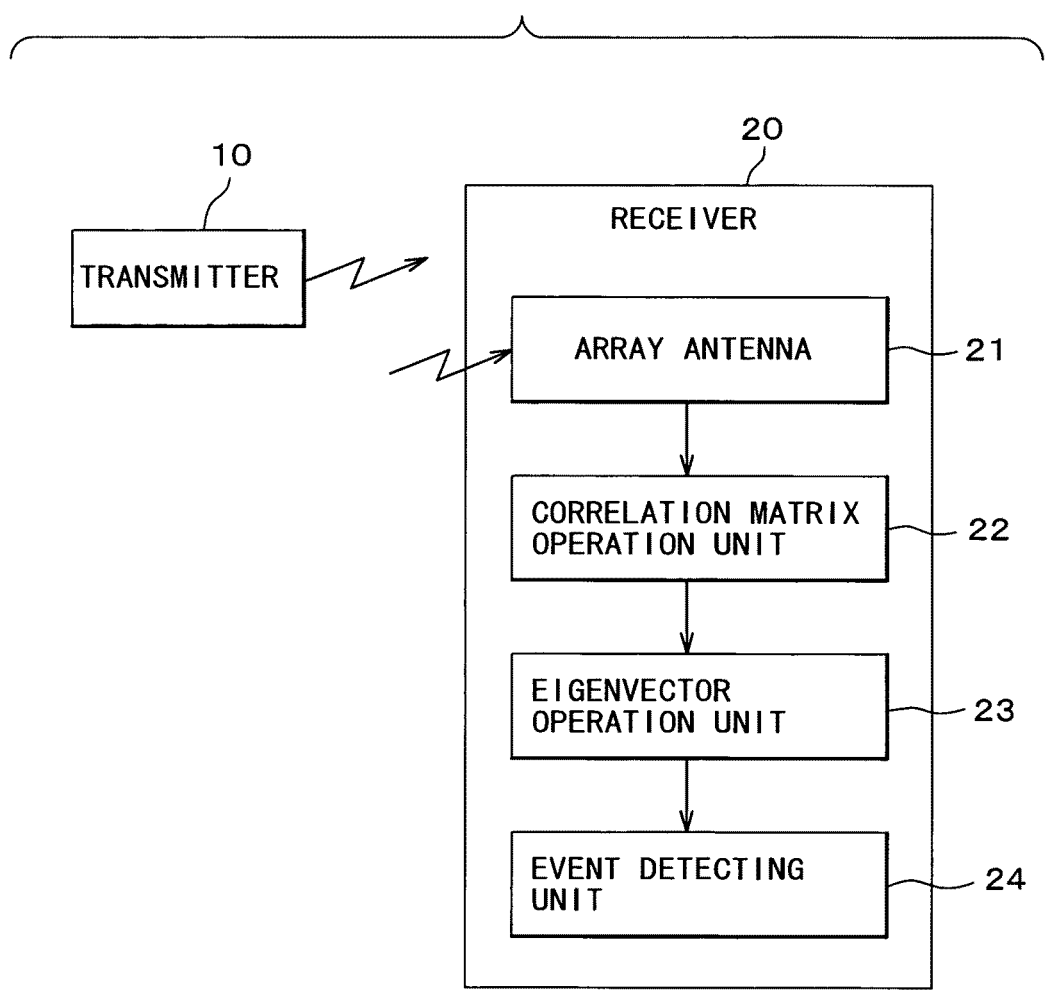
FIG. 1 is a diagram showing a configuration of an event detecting apparatus according to an example of the present invention.

FIG. 1 is a diagram showing a configuration of an event detecting apparatus according to an example of the present invention. An event detecting apparatus of the present example comprises a transmitter 10 and a receiver 20. The transmitter 10 and the receiver 20 are installed in a predetermined area in order to detect an event such as a movement of a person or opening or closing of doors. The predetermined area is preferably a closed space such as a room. However, the predetermined area may be an open area. The transmitter 10 transmits radio waves. The receiver 20 comprises an array antenna 21, a correlation matrix operation unit 22, an eigenvector operation unit 23, and an event detecting unit 24. The array antenna 21 is composed of a plurality of antenna elements, and the respective antenna elements receive radio waves transmitted from the transmitter 10. Here, an example in which the respective antenna elements are arrayed on a straight line will be described. Received signals by the array antenna 21 are expressed by received vectors $\vec{x}(t)$ containing received signals by the respective antenna elements of the array antenna 21 as elements. Here the term "→" means that the letter on the left thereof is a vector in the text.

$$\vec{x}(t) = \vec{a}(\theta)s(t) + \vec{n}(t) \qquad (1)$$

where, $\vec{a}(\theta)$: L-dimensional vector given that the number of antenna elements is L
s(t): received signal at a reference point
$\vec{n}(t)$: noise

[Math. 1]

$$a(\theta) = \left[1, \exp\left(-j\frac{2\pi}{\lambda}d\cos\theta\right), \ldots, \exp\left(-j\frac{2\pi}{\lambda}(L-1)d\cos\theta\right)\right]^T \qquad (2)$$

where, θ: radio wave arrival direction with respect to the array direction of the antenna array 21
d: distance between respective elements of the antenna array 21
λ: radio wavelength
Here, when M incoming waves arrive as plane waves, $$\vec{x}(t) = A\vec{s}(t) + \vec{n}(t) \qquad (3)$$

where, $\vec{A}$: L×M matrix in which M vectors (called "steering vector") serve as a column
$\vec{s}(t)$: M-dimensional vectors containing complex amplitudes of respective incoming waves as elements

[Math. 2]

$$A = [a(\theta_1), \ldots, a(\theta_M)] \qquad (4)$$

[Math. 3]

$$s(t) = [s_1(t), \ldots, s_M(t)]^T \qquad (5)$$

where, T denotes transposition.
The correlation matrix operation unit 22 operates a correlation matrix $\vec{R}_{xx}$ on the basis of the received vectors $\vec{x}(t)$.

[Math. 4]

$$R_{xx} = E[x(t)x(t)^H] \qquad (6)$$

where, $\vec{E}[\bullet]$: ensemble mean
H: complex conjugate transposition
Here, because noise occurs independently of incoming waves, and is independent of elements,

[Math. 5]

$$R_{xx} = ASA^H + \sigma^2 I \qquad (7)$$

where, σ: noise variance
$\vec{S}$: wave source correlation matrix = $\vec{E}[\vec{s}(t)\vec{s}(t)^H]$
Further,
by use of eigenvalues λi acquired from

[Math. 6]

$$R_{xx}v_i = (ASA^H + \sigma^2 I)v_i = \lambda_i v_i \; i = 1, 2, \ldots, L \qquad (8)$$

and eigenvectors $\vec{v}_i$ corresponding to the eigenvalues λi, it is possible to perform eigenvalue expansion such that:

[Math. 7]

$$R_{xx} = ASA^H + \sigma^2 I \qquad (9)$$
$$= \sum_{i=1}^{L} \lambda_i v_i v_i^H$$
$$= V\Lambda V^H$$

where,

[Math. 8]

$$V = [v_1, v_2, \ldots, v_L]$$
$$\lambda = \text{diag}\{\lambda_1, \lambda_2, \ldots, \lambda_L\} \qquad (10)$$

where, diag denotes that diagonal elements of the matrix are arrayed.
Here, the eigenvalues of the received data correlation matrix $\vec{R}_{xx}$ can be divided into K signal eigenvalues corresponding to a sum of one group of coherent waves and the number of incoherent waves, and L-K noise eigenvalues whose magnitudes correspond to noise power. That is,

[Math. 9]

$$\lambda_1 \geq \lambda_2 \geq \ldots \geq \lambda_K > \lambda_{K+1} = \ldots = \lambda_L = \sigma^2 \qquad (11)$$

It has been described above that it is possible to be divided into a signal subspace and a noise subspace by performing eigenvalue expansion of a correlation matrix $\vec{R}_{xx}$ generated on the basis of received vectors. An eigenvector $\vec{v}$ covering the signal subspace and a steering vector $\vec{a}(\theta)$ cover the same space, and both vectors can be respectively expressed as linear coupling with the other side. That is, an eigenvector covering the signal subspace can be expressed as linear coupling of a steering vector including its arrival direction information, that expresses a radio wave propagation structure.
Here, the first eigenvector $\vec{v}1$ is an eigenvector corresponding to λ1 at which an eigenvalue shows a highest value, and as long as signals reach the receiver, the first eigenvector $\vec{v}1$ is the base of the signal subspace by necessity, and this can be expressed by;

[Math. 10]

$$v_1 = \text{span}\{a(\theta_1), \ldots, a(\theta_M)\} \qquad (12)$$

where span is a set of vectors composed of linear couplings of vectors. In a case in which waves coherent to each other arrive, because linear coupling of their steering vectors thereof becomes a new steering vector, the case has no effect on the essence of the above formula. Accordingly, the first eigenvector expresses a signal space in a multipath environment, that is uniquely determined in accordance with a propagation environment. Then, the eigenvector operation unit 23 calculates the first eigenvector $\vec{v}1$ on the basis of the correlation matrix $\vec{R}_{xx}$.
Here, a performance function P(t) for event detection is the inner product of a first eigenvector $\vec{v}$none acquired in advance when no event occurs with a first eigenvector $\vec{v}$ob acquired during the observation of event detection;

[Math. 11]

$$P(t) = v_{none} v_{ob}(t) \qquad (13)$$

where, the magnitudes of the eigenvectors are both normalized to be 1.

During an observation time when no event occurs, because the propagation environment is not changed, v→ob(tnone) shows a value extremely approximate to v→none, which leads to a value approximate to 1. On the other hand, during an observation time t=tevent when an event occurs, because the propagation environment is changed, and v→ob(tevent) shows a value different from v→none, which leads to a value less than 1. Accordingly, it is possible to detect an event by appropriately setting a threshold value Pth, which is to be in;

[Math. 12]

$$P(t_{none}) > P_{th} > P(t_{event}) \qquad (14)$$

Then, the event detecting unit 24 makes a judgment of this formula (14) to detect an event.

Figure 2:
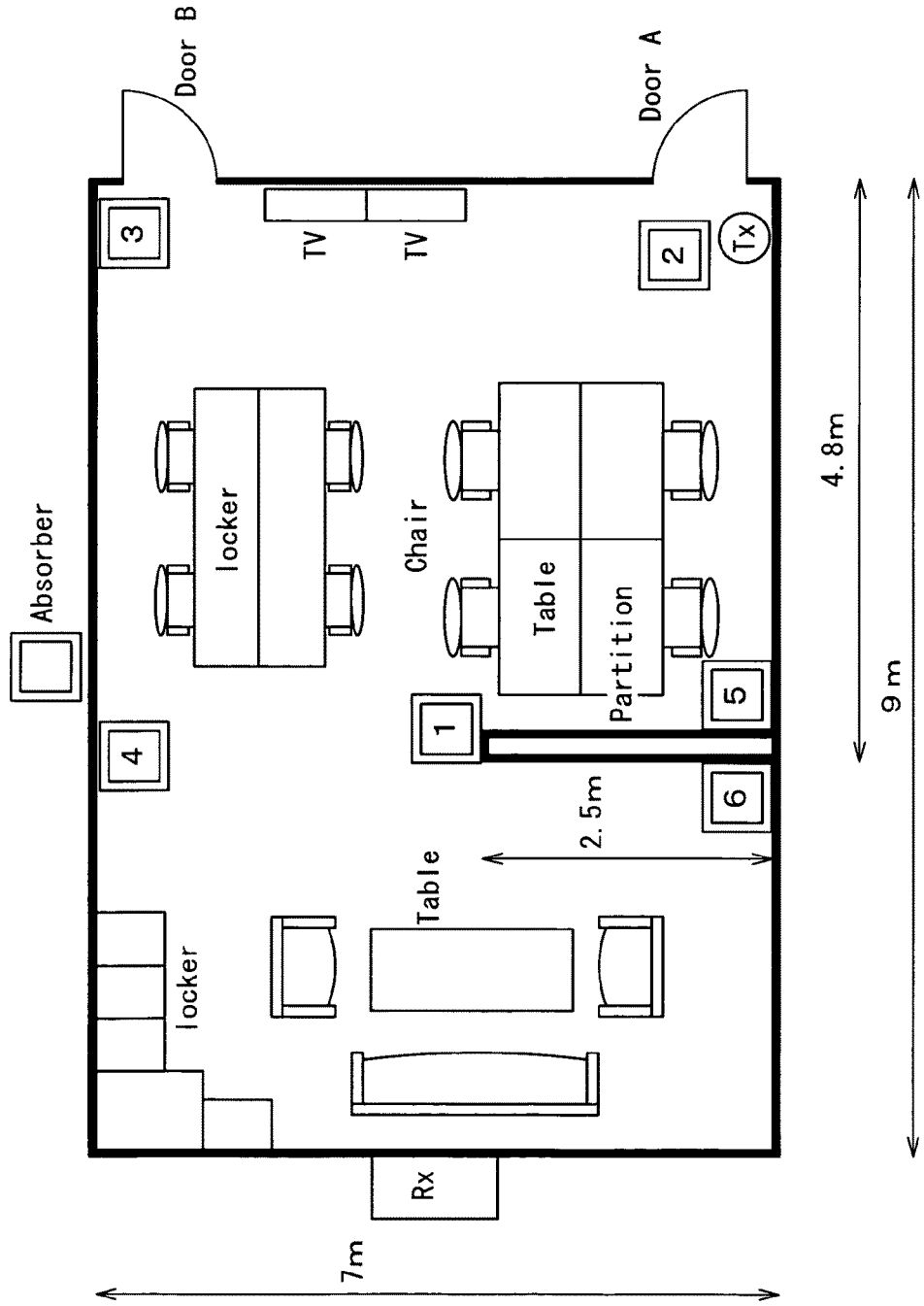
FIG. 2 is a diagram showing an environment in which an experiment of the present example has been performed.

FIG. 2 is a diagram showing an environment in which an experiment of the present example has been performed. A transmitter Tx and a receiver Rx are installed in a room, and absorbers 1 to 6 are disposed in order, and a door A and a door B are opened.

TABLE 1

| | |
|---|---|
| Transmit frequency | 2.335 GHz |
| Transmit power | −15 dBm |
| Modulation method | π/4shift QPSK |
| Transmit antenna | Dipole antenna |
| Receive antenna | 8-element linear array |
| Interelement spacing | Half-wave length |
| Symbol rate | 21 ksymbol/sec |
| Sampling rate | 2 MHz |
| Intermediate frequency | 450 kHz |
| Number of snapshots | 20000 |

Table 1 shows the experimental specifications. In this experiment, the center frequency of 2.335 GHz is utilized for a transmitter signal, and π/4 shift QPSK is utilized as a modulation method. Further, at the receiver side, received signals are converted so as to have a lower center frequency (450 kHz), and the signals are quantized to be recorded in a recorder. At this time, the number of samples at one time is 20000. Recorded data are processed on a PC, and a correlation matrix thereof is calculated.

Figure 3:
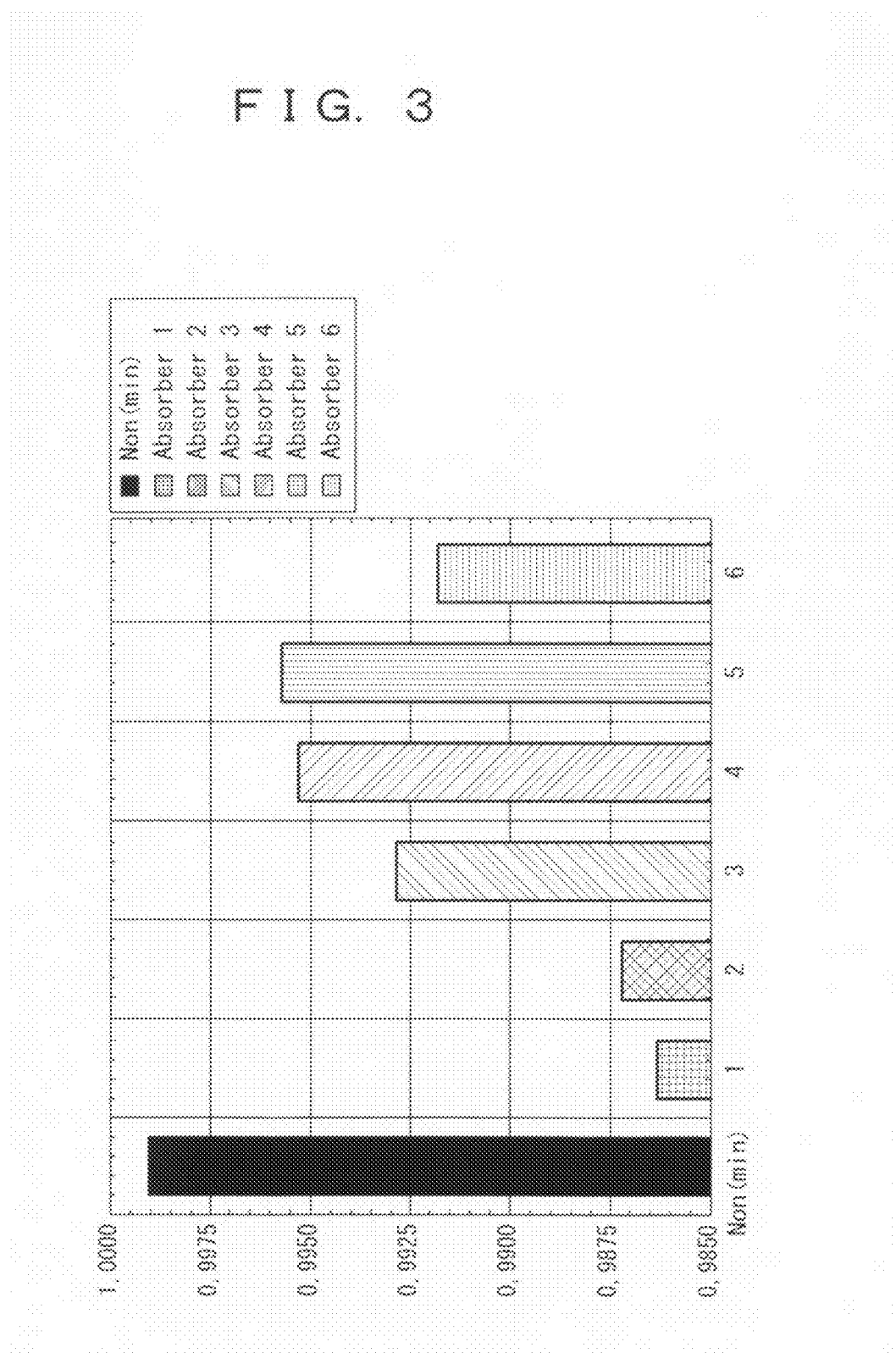
FIG. 3 is a graph showing evaluation results of a static event.

FIG. 3 is a graph when the absorbers are disposed in order, to acquire values of P(t) several times as an evaluation of a static event. Consequently, the maximum values of P(t) of the respective dispositions are shown. However, only None (min) shows the minimum value of P(t) in a state in which no absorber is placed. It is found that, in any case in which an absorber is disposed at this time, the change in the propagation environment has been captured, and the value of P(t) is changed, which makes it possible to discriminate the case from the state in which no absorber is placed.

FIG. 4 shows a state in which the doors are opened being observed in time series as an evaluation of a dynamic event. The door opening is carried out at two areas of the door A and the door B as shown in FIG. 2. To see FIG. 4 which are the results thereof, the value of P(t) has almost no variation in a state in which nothing occurs before opening the doors. On the other hand, when the doors are opened, the value of P(t) has changed in accordance with the propagation environment. Accordingly, it is found that it is possible to detect door opening.

Note that the present invention is not limited to the above-described example.

As a transmitter, any transmitter capable of generating radio waves which can be received by an array antenna, that is even utilized for another system, can be used along with the system. This corresponds to a base station for a wireless LAN, for example. Further, signals may be wide-band signals or narrow-band signals.

An antenna may be an antenna composed of a plurality of elements, and may not necessarily be an array antenna.

The eigenvector operation unit may operate a plurality of eigenvectors, and is not necessarily limited to a unit operating only eigenvectors corresponding to maximum eigenvalues of its correlation matrix.

The event detecting unit is not limited to a unit finding an inner product of eigenvectors, and may be any unit detecting a temporal change, that may find a difference or a ratio of eigenvectors, for example.

The present specification incorporates the disclosure in the specification and/or the drawings of Japanese Patent Application No. 2007-056462 whose priority is claimed in the present application.

All the publications, patents and patent applications cited in the present specification are incorporated in the present specification by reference in their entirety.

The invention claimed is:

1. An event detecting apparatus comprising:
a plurality of antennas configured to receive radio waves transmitted from a transmitter;
a correlation matrix calculation unit configured to calculate a correlation matrix from a received vector with signals received by the plurality of antennas as the received vector;
an eigenvector calculation unit configured to calculate an eigenvector which covers a signal subspace by eigenvalue expansion of the correlation matrix calculated by the correlation matrix calculation unit; and
an event detecting unit configured to detect an event by detecting a temporal change of the eigenvector calculated by the eigenvector calculation unit.

2. The event detecting apparatus according to claim 1, wherein the plurality of antennas are an array antenna.

3. The event detecting apparatus according to claim 2, wherein the eigenvector calculation unit is configured to calculate an eigenvector corresponding to a maximum eigenvalue of the correlation matrix.

4. The event detecting apparatus according to claim 2, wherein the event detecting unit compares is configured to compare an inner product of the eigenvector during normal time and the eigenvector during observation with a predetermined threshold value.

5. The event detecting apparatus according to claim 1, wherein the eigenvector calculation unit is configured to calculate an eigenvector corresponding to a maximum eigenvalue of the correlation matrix.

6. The event detecting apparatus according to claim 5, wherein the event detecting unit is configured to compare compares an inner product of the eigenvector during normal time and the eigenvector during observation with a predetermined threshold value.

7. The event detecting apparatus according to claim 1, wherein the event detecting unit is configured to compare compares an inner product of the eigenvector during normal time and the eigenvector during observation with a predetermined threshold value.

* * * * *